United States Patent
Janakiraman et al.

(10) Patent No.: US 11,165,828 B2
(45) Date of Patent: Nov. 2, 2021

(54) SYSTEMS AND METHODS FOR ON-DEMAND FLOW-BASED POLICY ENFORCEMENT IN MULTI-CLOUD ENVIRONMENTS

(71) Applicant: Cisco Technology, Inc., San Jose, CA (US)

(72) Inventors: Rajagopalan Janakiraman, Cupertino, CA (US); Ronak K. Desai, Fremont, CA (US); Sivakumar Ganapathy, Fremont, CA (US); Mohammed Javed Asghar, Dublin, CA (US); Azeem Suleman, San Jose, CA (US); Patel Amitkumar Valjibhai, Fremont, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 237 days.

(21) Appl. No.: 16/289,647

(22) Filed: Feb. 28, 2019

(65) Prior Publication Data
US 2020/0280587 A1    Sep. 3, 2020

(51) Int. Cl.
*H04L 12/24*    (2006.01)
*H04L 29/06*    (2006.01)

(52) U.S. Cl.
CPC .......... *H04L 63/20* (2013.01); *H04L 41/0893* (2013.01); *H04L 41/12* (2013.01); *H04L 63/0227* (2013.01)

(58) Field of Classification Search
None
See application file for complete search history.

(56) References Cited

U.S. PATENT DOCUMENTS

| | | | |
|---|---|---|---|
| 9,191,282 B2* | 11/2015 | Kakadia | H04L 41/5006 |
| 2017/0026382 A1* | 1/2017 | Trigger | H04L 63/102 |
| 2018/0241636 A1* | 8/2018 | Zhang | H04L 45/24 |

FOREIGN PATENT DOCUMENTS

| | | | |
|---|---|---|---|
| CN | 109120525 A | 1/2019 | |
| EP | 3273650 A1 | 1/2018 | |
| EP | 3273650 A1 * | 1/2018 | H04L 45/42 |

OTHER PUBLICATIONS

International Search Report and Written Opinion from the International Searching Authority, dated May 12, 2020, 13 pages, for corresponding International Patent Application No. PCT/US2020/019005.

* cited by examiner

*Primary Examiner* — Cai Y Chen
(74) *Attorney, Agent, or Firm* — Polsinelli PC

(57) ABSTRACT

Systems, methods, and computer-readable media for policy splitting in multi-cloud fabrics. In some examples, a method can include discovering a path from a first endpoint in a first cloud to a second endpoint in a second cloud; determining runtime policy table capacities associated with nodes in the path; determining policy distribution and enforcement for traffic from the first endpoint to the second endpoint based on the runtime policy table capacities; based on the policy distribution and enforcement, installing a set of policies for traffic from the first endpoint to the second endpoint across a set of nodes in the path; and applying the set of policies to traffic from the first endpoint in the first cloud to the second endpoint in the second cloud.

20 Claims, 7 Drawing Sheets

SYSTEMS AND METHODS FOR ON-DEMAND FLOW-BASED POLICY ENFORCEMENT IN MULTI-CLOUD ENVIRONMENTS

TECHNICAL FIELD

The present technology pertains to cloud computing, and more specifically to multi-cloud policy enforcement.

BACKGROUND

The ubiquity of Internet-enabled devices has created an enormous demand for Internet services and content. We have become a connected society where users are increasingly reliant on network services and content. This Internet-connected revolution has created significant challenges for service and content providers who often struggle to service a high volume of user requests without falling short of user performance expectations. For example, cloud providers (e.g., public clouds, etc.) typically need large and complex datacenters to keep up with network and content demands from users. These datacenters are generally equipped with server farms configured to host specific services, and include numerous switches and routers programmed to route datacenter traffic and enforce a large amount of policies. In many instances, a specific datacenter is expected to handle millions of traffic flows and enforce numerous security requirements.

These public clouds can be configured in a multi-cloud environment (e.g., multiple public clouds talking with each other). These multi-cloud environments can have issues with the scale of the policy rules. This problem gets exponentially worse when integrating between public clouds (e.g., Amazon Web Services (AWS), Microsoft Azure, etc.) as well as high scaled policy environments (e.g., Cisco's Application Policy Infrastructure). Consequently, the disparate policy models and configuration restrictions between cloud environments can significantly limit the scalability and uniformity of policies in multi-cloud implementations. For instance, in Amazon Web Services (AWS) environments, the number of policy rules that can be applied for a Virtual Machine (VM) Network Interface Card (NIC) is limited to 300 rules in both directions (e.g., egress, ingress), which can be quite restrictive particularly when a VM in AWS needs to communicate with external endpoints (e.g., VMs in another cloud environment or datacenter such as Microsoft's Azure public cloud, endpoints in an application-centric infrastructure (ACI) fabric, etc.).

Another challenge faced in multi-cloud implementations is when running containers running in a public cloud. The number of policy rules natively available or supported in the public clouds (e.g., AWS, Azure, etc.) is generally insufficient to handle the operations of containers in the public clouds, resulting in the application of coarse policy rules without granularity. Moreover, as more granular policy rules are applied in the public cloud, the resources in the public cloud can quickly become overloaded which greatly limits the security and traffic segmentation capabilities supported for such containers.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
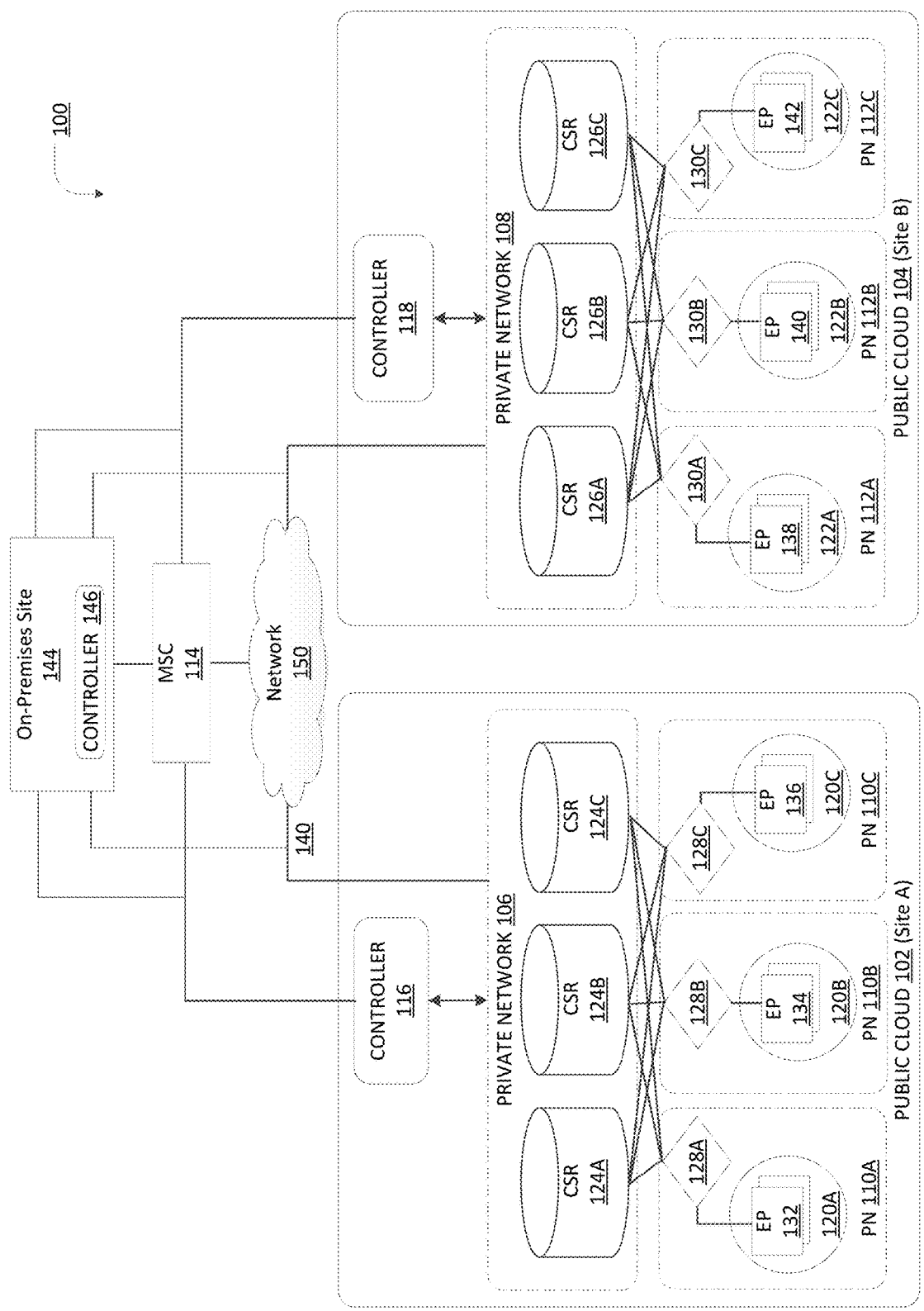
FIG. 1 illustrates an example architecture for policy splitting in a multi-cloud fabric including multiple public clouds, in accordance with some examples.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed herein are systems, methods, and non-transitory computer-readable media for on-demand, flow-based policy enforcement, splitting and integration in multi-cloud environments. In some examples, the systems, methods and computer-readable media can distribute rules and security policies for flows across nodes along a path of the flows. At least some of the nodes can include endpoints and routers (which can function as "policy agents") on one or more routing domains, virtual private clouds and/or network fabrics in a multi-cloud environment. In some examples, routers and virtual private clouds in the multi-cloud environment can be configured in a hub and spoke topology and can be hosted on one or more clouds or fabrics associated with the multi-cloud environment. The one or more clouds or fabrics can include, for example, a public cloud, a private cloud, an on-premises site, etc., and the multi-cloud environment can extend to multiple clouds and/or fabrics, such as public and/or private clouds, for example.

Further disclosed are systems, methods, and non-transitory computer-readable media for policy deployment and enforcement which can include discovering a path from a first endpoint (e.g., a virtual machine, a server, a container, a network interface, a computing device, etc.) in a first cloud environment to a second endpoint in a second cloud environment, determining runtime policy table capacities associated with a subset of nodes in the path, determining policy enforcement (e.g., policy distribution and enforcement) for traffic from the first endpoint to the second endpoint based on the runtime policy table capacities, deploying policies across a set of nodes in the path, and applying (e.g., enforcing) the policies to data transmitted between the first endpoint in the first cloud environment and the second endpoint in the second cloud environment. In some instances, discovering the path can include determining a plurality of nodes along the path. The nodes can include, for example, routers (e.g., virtual routers, physical routers, etc.), switches, endpoints (e.g., virtual machines, containers, servers, network interfaces, etc.), and/or any other device or element with networking capabilities along the path.

In some instances, the policy table capacity can be determined by performing a runtime check on the policy table capacity of the nodes. Moreover, in some examples, determining policy enforcement and deployment policies can be based on the runtime check and can include determining a node from the plurality of nodes to install one or more of the policies, running a destination address of the second endpoint against routing tables in the path leading to the endpoint, and determining a widest subnet associated with the destination address, the path to the endpoint, and/or the endpoint. In some instances, the installation of policies can include associating policies with a widest subnet associated with the traffic between the first endpoint and the second endpoint. The policies deployed at the nodes along the path can include one or more filters which permit communications from the first endpoint to the second endpoint for one or more ports. The policies and/or filters can be associated with a contract configured for a first endpoint group (EPG) and/or other policy construct associated with the first endpoint, and/or a second EPG and/or other policy construct associated with the second endpoint.

In some instances, the installation of policies can include installing a policy enabling (e.g., permitting) traffic for the widest subnet. In some examples, the policy can be installed at the first endpoint, the second endpoint, or the node in the path. In some instances, the policy distribution and enforcement can include a funnel enforcement (e.g., enforcement of coarse or broad policies, enforcement of granular policies, enforcement of policies from coarse to granular or vice versa) installed at the first endpoint.

In some instances, the systems, methods and non-transitory computer readable media can install, at the node, one or more filters which only allow traffic from the first endpoint to the second endpoint for one or more specified ports in a contract between a first endpoint group including the first endpoint and a second endpoint group including the second endpoint.

In some instances, the systems, methods and non-transitory computer readable media can determine an age of one or more policies installed at the first endpoint, the second endpoint and/or one or more nodes; and in response to the age of a policy being greater than a threshold age, removing the policy.

DESCRIPTION OF EXAMPLE EMBODIMENTS

The disclosed technologies address the need in the art for elastic policy enforcement and policy integration in multi-cloud environments. The approaches set forth herein can integrate policy rules across disparate cloud or datacenter environments and support policy splitting or distribution across the disparate cloud or datacenter environments despite specific policy restrictions imposed by any particular cloud provider in the multi-cloud environment. For example, the approaches herein can deploy and/or enforcement policies for a flow of traffic across multiple cloud and network environments regardless of active rule limits set by any of the cloud and network environments. The approaches herein can thus provide increased policy scalability, uniformity, flexibility and granularity across the multiple cloud and network environments in the multi-cloud environment.

In some cases, the approaches herein can deploy and/or enforce such policies on demand based on the flow of traffic. For example, the approaches herein can dynamically deploy and/or enforce policies based on packet headers and/or packet information (e.g., the source address associated with a packet, the destination address associated with a packet, the protocol associated with a packet, the source port associated with a packet, the destination port associated with a packet, etc.). In this way, the approaches herein can similarly improve policy and enforcement scalability, flexibility, granularity, efficiency, uniformity, etc., and can improve inter-cloud integration.

Figure 2:
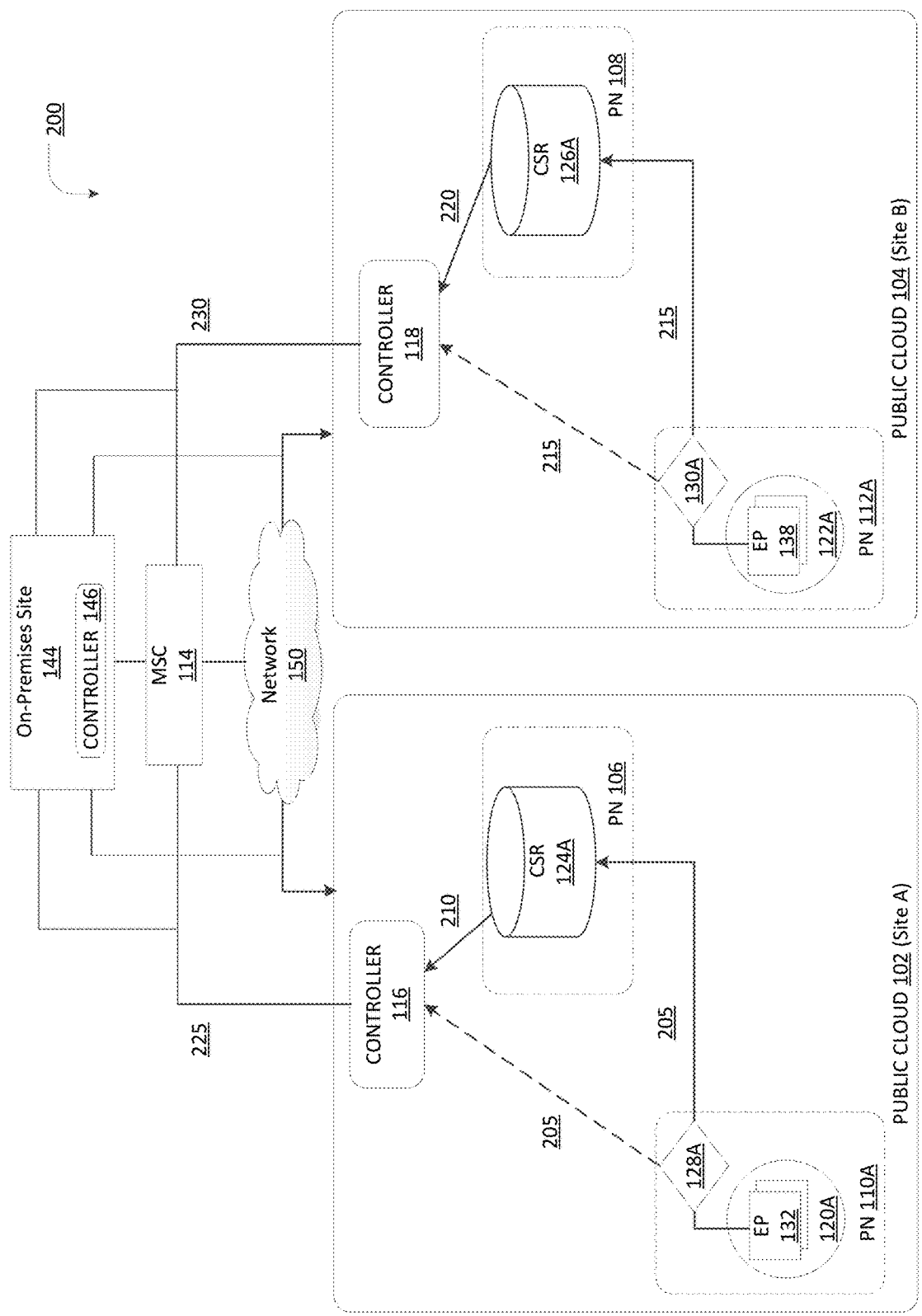
FIG. 2 illustrates example policy splitting which determines runtime table capacity in public clouds, in accordance with some examples.
Figure 4:
FIG. 4 illustrates an example method for policy splitting in multi-cloud fabrics, in accordance with some examples.
Figure 5:
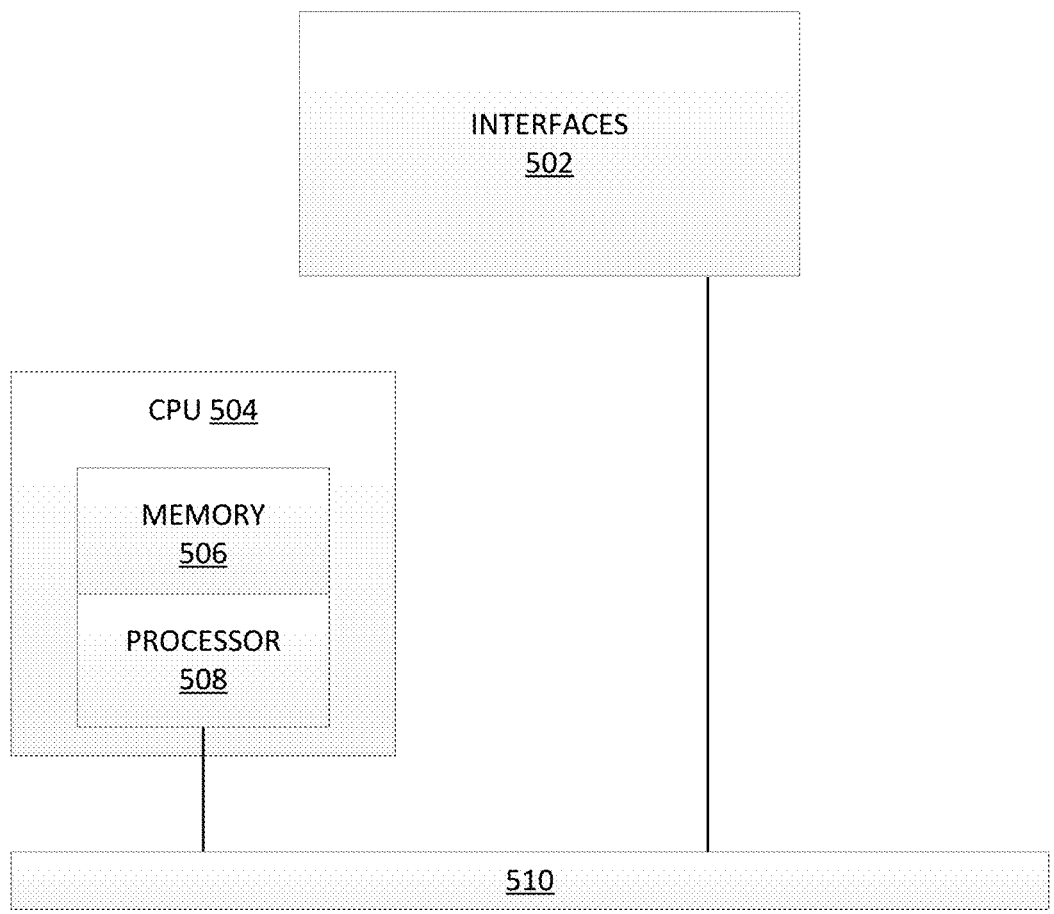
FIG. 5 illustrates an example network device in accordance with some examples.
Figure 6:
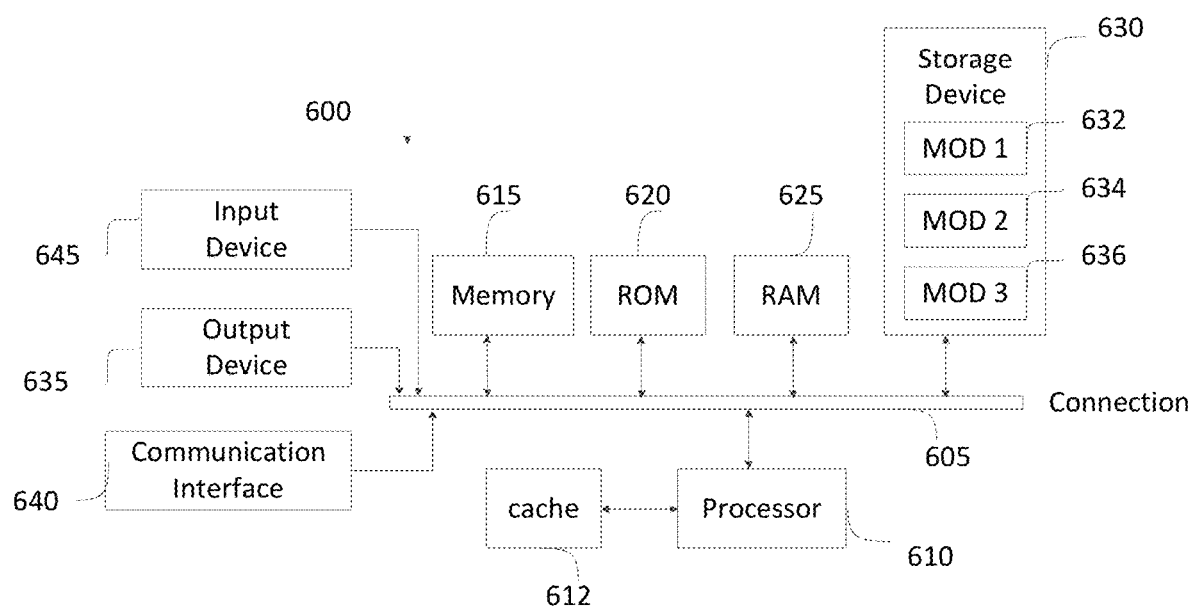
FIG. 6 illustrates an example computing device architecture in accordance with some examples.

The present technologies will be described in the following disclosure as follows. The discussion begins with an overview of policy splitting, distribution, and enforcement in a multi-cloud environment. The discussion continues with a description of an example architecture for policy splitting, distribution, and integration in a multi-cloud environment, as illustrated in FIGS. 1-3. A description of an example method for policy splitting, distribution, and integration in a multi-cloud environment, as illustrated in FIG. 4, will then follow. The discussion concludes with a description of an example network device, as illustrated in FIG. 5, and an example computing device architecture, as illustrated in FIG. 6, including example hardware components suitable for performing networking and computing operations. The disclosure now turns to an overview discussion of policy splitting and management in a multi-cloud environment.

A multi-cloud environment can include multiple clouds, private networks, fabrics and/or datacenters, such as Cisco's Application-Centric Infrastructure (ACI), Cisco's ACI anywhere solution, AWS virtual private cloud(s), Azurre virtual networks (VNETs), etc. Moreover, the multi-environment can manage network, security, and services for workloads in multiple network clouds, fabrics and/or datacenters, such as one or more cloud sites and/or on-premises datacenters. The multi-cloud environment can group endpoints and/or policies associated with endpoints into groups or collections of endpoints and/or associate the endpoints and/or policies associated with endpoints with policy constructs, such as endpoint groups (EPGs), security groups (SGs), etc., and apply policy rules or contracts to corresponding groups or collections of endpoints (e.g., EPGs, SGs, etc.) and/or policy constructs.

A group or policy construct, such as an EPG or SG, can include endpoints in multiple cloud(s), fabric(s), and/or on-premises datacenter(s). Such groups or policy constructs can be used to enforce policy rules or contracts for traffic from endpoints across the multi-cloud environment, including traffic from an public cloud, an on-premises datacenter and/or a network fabric to one or more different public clouds, on-premises datacenters, and/or network fabrics.

The policy rules and networking configurations can be managed by one or more controllers associated with the multi-cloud environment, such as one or more cloud controllers (e.g., Cisco's Application Policy Infrastructure Controller (APIC), a multi-site controller (MSC) or multi-site orchestrator (MSO), etc.).

As previously mentioned, networking configurations and policies in some public clouds can have various restrictions or limits imposed by the cloud provider(s). Such restrictions can include limits on the number of policy rules supported or allowed by the cloud provider(s). In some cases, such policy rule limitations can be much below the scale of policies supported by a datacenter, fabric and/or policy solution or model implemented by one or more other sites, clouds, fabrics and/or datacenters. For example, Cisco's ACI supports hundreds of thousands of policy rules, which can include 128K contract rules, 64K IP addresses, and 4K EPGs per leaf switch, while Amazon's AWS has a restriction of 300 policy rules per endpoint.

Accordingly, when multiple public cloud environments are integrated together in a multi-cloud environment and/or when Cisco's ACI solution is integrated with one or more public cloud solutions such as AWS, a public cloud's restrictions can reduce policy scalability across the multi-cloud environment and reduce the amount of policies that can be deployed and/or enforced for traffic associated with that public cloud well below the amount of policies implemented and/or supported by other network environments and/or routing domains (e.g., datacenters, fabrics, public clouds, virtual private networks, on-premises sites, etc.) in the multi-cloud environment. This can create security vulnerabilities and limitations, interrupt traffic flows and/or communications, and reduce traffic enforcement flexibility, granularity, and scalability in the multi-cloud environment. Moreover, different cloud providers and datacenter or fabric solutions often implement different policy models. The different policy models can result in inconsistent policy models in the multi-cloud environment and can limit or prevent policy integration and uniformity in the multi-cloud environment.

In some examples, policy rules on the cloud can be applied to destination endpoints and Layer 4 (L4) ports. Destination endpoints can be referred by, assigned to, and/or categorized based on, groups (e.g., EPGs, SGs, etc.) or addresses (e.g., IP addresses or prefixes). While grouping endpoints helps in scaling policy rules, such policy rules often cannot be applied to endpoints on different network environments (e.g., datacenters, fabrics, cloud environments, etc.). Moreover, given that some cloud providers and datacenter or fabric solutions in a multi-cloud environment may implement different policy models and/or constructs, endpoints residing on different network environments (e.g., different fabrics, datacenters, clouds, virtual private networks, routing domains, virtual routing and forwarding (VRF) instances, routing domains, etc.) may not be capable of being assigned to, or grouped into, a same group and/or type of group (e.g., a same EPG), which again can limit policy scalability, integration, granularity, flexibility, and uniformity.

Further, when a cloud host instance runs multiple applications, the policy rule limit imposed by the cloud provider can quickly be reached. For example, assume the multi-cloud environment includes a virtual private network (VPC) on an AWS cloud and there are 5 containers running on a cloud host on the AWS cloud and the 5 containers are port mapped. If a network operator implements policies for traffic associated with each container and port, the policies will quickly approach AWS's 300 rule limit. To illustrate, in this example, AWS's 300 rule limit will quickly be reached or approached when implementing policies for a mere 25 external endpoints or IPs communicating with the host: 25 IPs×5 TCP (Transmission Control Protocol) ports×2 directions. While having prefix-based rules can help with this scale limitation, such policy restrictions become severe when group policies need to be applied to individual IP addresses (e.g., /32 IPs). Yet, in some cases, /32 IP addresses may be necessary in order to support micro-segmentation or compute label-based grouping, where IP subnets and policies are essentially decoupled.

In addition, for a multi-cloud interconnect, one or more public clouds may not provide or support a Layer 2 (L2) stretch. In a multi-cloud environment (or any network environment with different routing domains), this in turn means that policy rules need to be applied on Layer 3 (L3) constructs, which then become significantly limited by the cloud provider's resource scale limits as mentioned above. Also, a cloud provider can often limit the amount of network addresses available for a routing domain (e.g., virtual private cloud or network) on that cloud, further limiting the policy and routing scale in the multi-cloud environment for traffic associated with that cloud.

To overcome the scale limits imposed by certain public clouds and/or fabric or datacenter solutions, the approaches herein can spilt and distribute policies across nodes in the multi-cloud environment, and apply policies for specific flows in an ad hoc or on-demand basis, without being limited by cloud-native constructs such as AWS or Azurre security groups. The policies can be implemented on endpoints, routers (e.g., cloud services routers (CSRs) such as Cisco's CSR 1000v, etc.) or policy engines or agents (which can be software or VM-based policy agents) running on network devices such as routers. As used herein, rules, policies and contracts can be used interchangeably.

FIG. 1 illustrates an example architecture 100 for on-demand, flow-based policy enforcement, scaling and integration in a multi-cloud fabric. The architecture 100 can include a first public cloud 102 (e.g., Site A) and second public cloud 104 (e.g., Site B). Each public cloud (e.g., 102, 104, etc.) can have or host interconnected private networks 106, 108, 110A, 110B, 110C, 112A, 112B, 112C, etc.

The architecture 100 can include a multi-site controller 114 (e.g., multi-site APIC) which communicates with a cloud controllers 116, 118 (e.g., cloud APIC) on the public clouds 102, 104 and controller 146 (e.g., APIC) on the on-premises site 144 (e.g., ACI fabric). The multi-site controller 114 ("MSC") works with cloud controllers 116, 118 and controller 146 to manage and implement policies and configurations on the public clouds 102, 104 and the on-premises site 144. The multi-site controller 114 can implement a same policy model on both the public clouds 102, 104, along with the on-premises site 144, which can include, for example, a private network, a private cloud, a private datacenter, a private network fabric, etc. For example, the multi-site controller 114 can implement EPGs and/or EPG policies on the public clouds 102, 104 and the on-premises site 144. Such policies can be coordinated by the multi-site controller 114 with the cloud controllers 116, 118 in the public clouds 102, 104 and the controller 146 in the on-premises site 144.

The on-premises site 144 can implement a policy model based on the datacenter or fabric solution used by the on-premises site 144. For example, in some cases, the on-premises site 144 can implement Cisco's ACI to configure, manage, and apply different policies for traffic and endpoints on the on-premises site 144. In some examples, the on-premises site 144 can apply EPGs for specific endpoints and/or traffic in the on-premises site 144. In some cases, an EPG can be a construct implemented by the on-premises site 144, the multi-site controller 114 and the controllers 116, 118, 146, which allows specific rules to be applied to specific traffic or endpoints. An EPG can acts as a virtual firewall, filter and/or policy group for associated traffic and/or endpoints. In some cases, the on-premises site 144 can host private networks, such as virtual routing and forwarding (VRF) instances, to provide network and/or traffic segregation. The private networks (e.g., VRFs) can host a number of respective endpoints and applications, and can have specific policies and addressing information assigned to them. In some cases, the EPGs can follow a whitelist model which supports allow or permit rules to be defined to allow traffic associated with those allow or permit rules.

Each public cloud (e.g., 102, 104) may also natively implement a different policy model and may have its own set of requirements (e.g., policy requirements, scalability requirements, etc.) which may differ from those supported or implemented by the multi-site controller 114, the cloud controllers 116, 118, the controller 146, and/or the on-premises site 144. The policy model and requirements on the public clouds 102, 104 can depend on the cloud provider. For example, AWS may implement security groups and impose a 300-rule limit. As further described below, the approaches herein can integrate and scale the policy model and requirements imposed by the public clouds with those associated with the multi-site controller 114, the cloud controllers 116, 118, the controller 146 and/or the on-premises site 144, in order to apply a consistent policy model and increase the scalability of the overall implementation in the example architecture 100.

The public clouds can include private networks 106, 108, 110A-C, 112A-C which represent private routing domains or networks (e.g., virtual private clouds (VPC), virtual networks (VNET), etc.) hosted on the public clouds. The private networks can host applications and resources on the public clouds for use by other clouds or networks, such as on-premises site 144. In some cases, the private networks can represent, correspond or translate to virtual routing and forwarding (VRF) instances in the on-premises site 144.

Private networks 110A-C, 112A-C on public clouds 102, 104 can be interconnected (e.g., to each other, to other public clouds, to on-premises site 144, etc.) via private networks 106, 108. In this example, private networks 106, 110A-C are configured in a hub-and-spoke topology, with private network 106 serving as the hub and private networks 110A-C serving as spokes. Other interconnections and topologies are also possible and contemplated herein.

Private networks 110A-C, 112A-C can include respective virtual gateways 128A-C, 130A-C which interconnect the private networks 110A-C, 112A-C with private networks 106, 108 respectively and route traffic in and out of the private networks 110A-C, 112A-C. In some cases, the virtual gateways 128A-C, 130A-C can be, for example, VMs deployed on the public cloud and, more specifically, on each of the private networks 110A-C, 112A-C which run respective network services such as WAN or network gateway services. In other examples, the virtual gateways 128A-C, 130A-C can be cloud services routers (CSRs) or any other type of routing device or component. Private networks 110A-C, 112A-C can also host respective endpoints 132-142 which connect to the respective virtual gateways 128A-C, 130A-C to communicate with devices and applications outside of the respective private networks 110A-C, 112A-C, such as private networks 106, 108. Each of the private networks 110A-C, 112A-C can host any number of end-points, and multiple endpoints on a particular private network can have similar or different attributes.

In this example, endpoint (EP) 132 on private network 110A is associated with security group 120A (other EPs can be associated with one or more other security groups, which are not shown). The security groups can be security constructs implemented by the public clouds 102, 104 which allow specific rules to be applied to traffic and/or endpoints associated with the security groups. In some cases, a security group can act as a virtual firewall, filter and/or policy group for associated traffic and/or endpoints. In some cases, the endpoints 132-142 and/or the security groups 120A-C, 122A-C can follow a whitelist model which supports allow or permit rules to be defined to allow traffic associated with those allow or permit rules.

The private networks 106, 108 (e.g., hub) can include one or more routers 124A-C, 126A-C. The routers 124A-C, 126A-C can be, for example, cloud services routers (CSRs), and can implement policy agents or engines configured to store and enforce policies and perform other functions as described herein. The routers 124A-C, 126A-C can connect (directly or indirectly) to virtual gateways 128A-C, 130A-C on private networks 100A-C, 112A-C to route traffic between private networks 106, 108 and private networks 110A-C, 122A-C, respectively. Each of the routers 124A-C, 126A-C can have routes to each of the virtual gateways 128A-C, 130A-C and thus can communicate with each of the virtual gateways 128A-C, 130A-C, respectively. However, in some cases, each of the routers 124A-C, 126A-C may only advertise route maps to a subset of the virtual gateways 128A-C, 130A-C to limit which virtual gateways a particular router will service (e.g., communicate with, route traffic for, etc.) for increased scalability.

In some cases, the routers can be virtual routers deployed on VMs in the public cloud. Moreover, the routers can include policy engines or software which, as further explained below, enable the routers to apply policies for traffic associated with the private networks (106, 108, 110A-C, 112A-C, etc.) without necessarily relying on cloud-native objects or constructs such as security groups and without being limited by the specific requirements or limitations imposed by the cloud provider associated with the public cloud. In some cases, the routers can include software or VM-based policy engines configured to apply specific policies to specific traffic and/or addresses (e.g., IP addresses or prefixes). The routers can thus double-up as routers and policy agents.

The routers 124A-C, 126A-C can be configured to be elastically or dynamically scalable based on multiple factors. For example, the routers can be elastically scalable based on the policy scale and bandwidth requirements of individual cloud endpoints (e.g., EPs 132-142) or group of endpoints. As another example, the routers can be scaled by routing domain (e.g., VRF, VPC, VNET, etc.), bandwidth availability on the routers, etc.

In many instances, the number of runtime policies can be limited in the public clouds. For example, public cloud AWS has a 300-policy limit. That is, public AWS clouds have a set limit on the number of policies that can be concurrently active. These limits can be quite restrictive when endpoints (e.g., virtual machines) from one public cloud need to communicate with external endpoints (e.g., virtual machines) in another public cloud (or private cloud) and/or on-premises site. In some examples, in order to combat these restrictions, policy rules can be split among nodes in the path between endpoints on different networks (e.g., public cloud 102, public cloud 104, on-premises site 144, etc.), as illustrated in FIGS. 1-3.

As shown in FIG. 1, when an endpoint (e.g., 132-136) in a first public cloud 102 wants to talk with an endpoint (e.g., 138-142) in a second public cloud 104 (and/or with an endpoint in the on-premises site 144), a path 140 between the public clouds (and/or the on-premises site 144) can first be discovered. In some examples, the path 140 can be discovered for a flow on-demand or dynamically based on the flow (e.g., based on the packet headers), and used to determine where and/or how to split policy rules and enforcement for the flow, as described herein. The path 140 can include one or more nodes within the public clouds and/or the on-premises site 144, for example, the egress endpoint (e.g., virtual machine 132), at some of the routers 124A-C, 126A-C, and ingress endpoint (e.g., 138). The path 140 will generally go through network 150 (e.g., Internet, tunnel, etc.). In some examples, there can be multiple nodes from the egress endpoint to the ingress endpoint.

FIG. 2 illustrates an example implementation 200 for policy splitting and determining runtime policy table capacities in a multi-site fabric (e.g., 100). For simplicity of illustration, and without limitation, FIG. 2 illustrates an example egress endpoint 132 and ingress endpoint 138, along with the nodes (e.g., 124A, 126A) of the discovered path 140 (as shown in FIG. 1). When the path 140 has been determined, along with the corresponding nodes, the runtime policy table capacity for the nodes can be determined. The runtime policy table capacity is the capacity the node has to activate or implement policies (e.g., based on the active policies, the node's capacity for storing or implementing policies, new or unallocated policies, etc.).

In this example, EP 132 reports 205 its runtime policy table capacity to controller 116. In some examples, virtual gateway 128A can transmit the runtime policy table capacity directly to controller 116. In other examples, virtual gateway 128A can transmit the runtime policy table capacity via private network 106 (e.g., hub/spoke model). Router 124A can report 210 the runtime policy table capacity directly to controller 116. EP 138 repots 215 its runtime policy table capacity to controller 118. In some examples, virtual gateway 130A can transmit the runtime policy table capacity directly to controller 118. In other examples, virtual gateway 130A can transmit the runtime policy table capacity via private network 108 (e.g., hub/spoke model).

Router 126A can report 220 the runtime policy table capacity directly to controller 118.

In response to receiving the runtime policy table capacities from the nodes in path 140, controllers 116, 118 can transmit the runtime policy table capacities to MSC 114. In some cases, the runtime policy table capacities can be transmitted to the MSC on regular intervals. MSC 114 can then determine the nodes in the path 140 that have the capacity to install or implement policy rules for traffic from EP 132 to EP 138. For example, the policies configured between EP 132 and 138 can include contracts defining rules for traffic between an endpoint group associated with EP 132 and an endpoint group associated with EP 138.

Based on the runtime policy table capacities received, the MSC 114 can split the policy rules to be applied for traffic between EP 132 and EP 138 across different nodes in the path 140. In an example, routers 124A-C can have different levels of capacity (for installing and/or activating a certain number of policy rules). MSC 114 can determine that routers 124B, 124C are being more heavily utilized than router 124A and/or have less current or future capacity for new policies than router 124A, and can distribute or install at least some of the policy rules (e.g., contracts) for traffic from EP 132 to EP 138 through or on router 124A. Given the differences in capacity between routers 124B, 124C and router 124A, in this example, the MSC 114 may select to install or activate more policies on router 124A than router 124B and/or router 124C, or may decide not to install or activate any policies on router 124B and/or router 124C, instead distributing all the policies for that particular flow across router 124A and one or more nodes on the path 140.

Figure 3A:
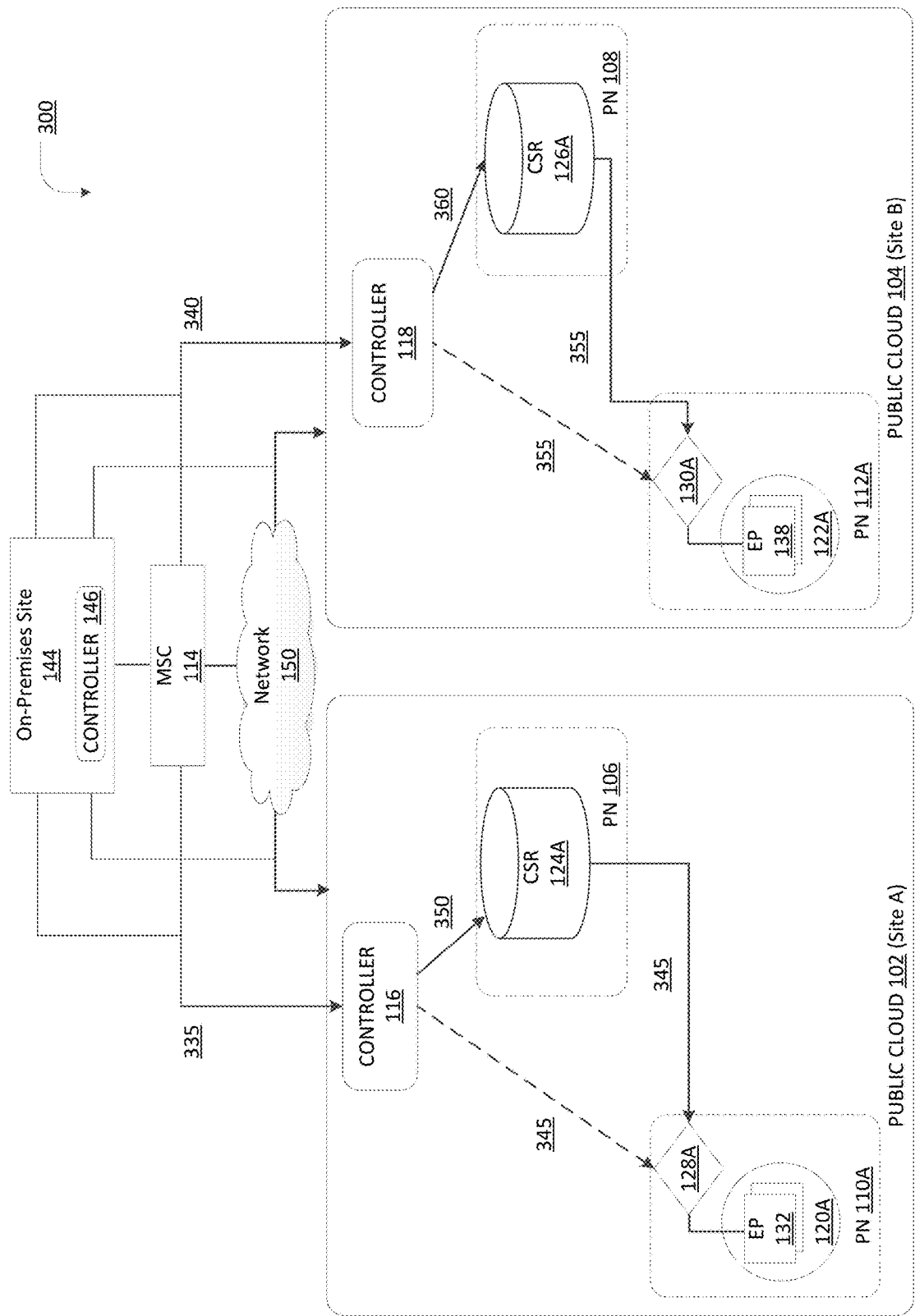
FIGS. 3A-B illustrates split rules being applied to a flow between endpoints on different public clouds configured in the example architecture shown in FIG. 1, in accordance with some examples.
Figure 3B:
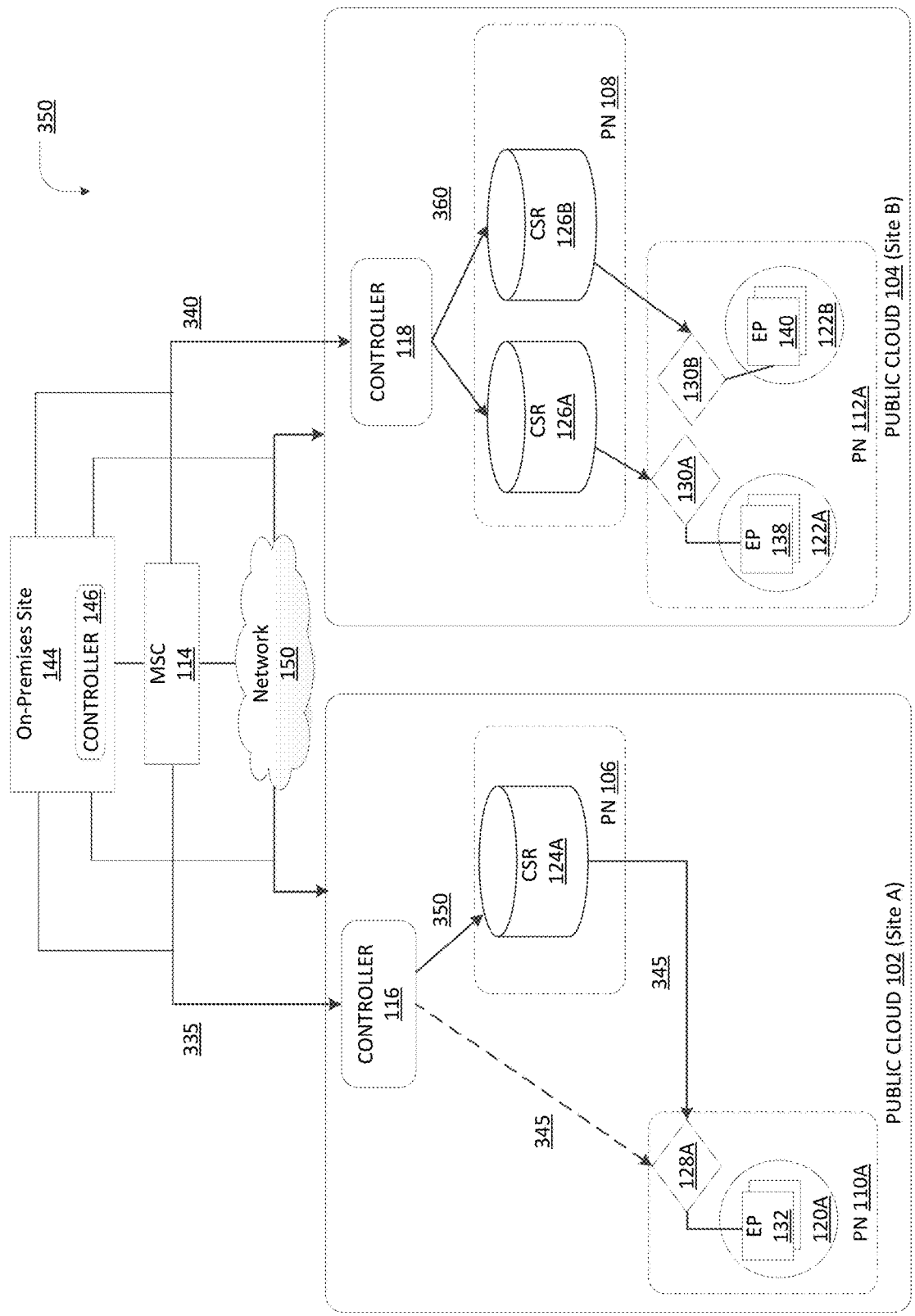

As illustrated in environments 300, 350 in FIG. 3A-B, MSC 114 can transmit 335, 340 the policy rules to be activated to the cloud controllers 116, 118. In some cases, the MSC 114 can also transmit policy rules to be activated to controller 146. The cloud controller 116 can then transmit 345, 350 one or more policy rules to selected nodes (e.g., 124A, 132) in the path to EP 132, dependent on the network configuration as previously described. The cloud controller 118 can transmit 355, 360 one or more of the policy rules to selected nodes (e.g., 126A, 138) in the path to EP 138, dependent on the network configuration as previously described. The policy rules can be distributed to specific nodes in the private networks 106, 110A, 108, 112A and/or the on-premises site 144 based on one or more splitting schemes, such as funnel based (e.g., from granular to coarse or vice versa), VRF or private network-based distribution, bandwidth-based distribution, node capacity, etc.

Policy splitting can be performed based on the runtime policy table capacities of the nodes on a path of specific flows. For example, as shown in FIG. 3B, if EP 132 is talking to both EP 138 and EP 140, the common policies (e.g., secure shell, etc.) between the EPs can be deployed on the hub or infra private network(s) (e.g., 106, 108) since the hub or infra private network(s) can implement the highest common denominator policies. In some examples, the coarse policies can be installed on the ingress private network (e.g., 108) and the more granular (e.g., delta) policies can be installed further along the path, for example in a funnel fashion. For example, with reference to FIG. 3A, for traffic from EP 132 to EP 138 and an additional endpoint (not shown) that resides in the private network 112A and/or is associated with an EPG corresponding to SG 122A, a coarse policy can be associated with the EPG and installed at router 126A in the private network 108, which can handle traffic to and from the EP 138 and the additional endpoint.

In a similar example and with reference to FIG. 3B, for traffic from EP 132 to EP 138 and 140, a coarse policy can be installed on routers 126A and 126B in the private network 108 because EP 138 and 140 are serviced by different routers 126A, 126B in that private network 108. In some examples, the course (or common) rules and/or the delta rules can be installed at routers 126A, 126B to route the flow (and enforce applicable policies) to the EP 138 and EP 140, respectively (e.g., in a funnel fashion). In other examples, the course rules may be installed on the routers 126A, 126B and the delta rules for EP 138 and 140 can be installed on virtual gateways 130A, 130B and/or EPs 138, 140. In some examples, a coarse policy rule can be a rule applicable to, or associated with, the widest subnet or prefix boundary that includes the addresses of the destination endpoints associated with that rule. In some examples, the delta policy rules can be rules applicable to, or associated with, narrower subnets (than the widest possible subnet or prefix from the coarse policy rule) or individual endpoints, and which can applied to traffic and/or endpoints associated with the delta policy rules.

The split policy rules applied can also have an associated timer. The timer can have an associated threshold time in which the split policy rules can be aged and cleaned up (e.g., removed). Since public clouds, such as AWS and Azure, have policy limits it is advantageous to ensure stale policy rules are removed so new policies can be enabled.

As illustrated herein, these approaches allow policies to be split between nodes in a path from endpoints, thereby bypassing native cloud resource limitations such as AWS' 300-rule limit. The disclosed scheme can achieve this with minimal addition to the number of rules at the endpoint, while providing greater scalability through other nodes on the path (e.g., routers 124, 126, 128, 130).

In some cases, the policy rules at nodes 126A, 126B, 126C can handle or include EPG rules for traffic within the CIDR of the private network 108, and the policy rules installed at the EPs 138, 140 can include a smaller set of rules for traffic associated with the EPs 138 and 140. Some of the rules can be split or distributed based on a route-aggregation scheme that maps policies to aggregated routes (e.g., widest prefix) associated with those policies.

Having described example systems and concepts, the disclosure now turns to the example method 400 illustrated in FIG. 4. The steps outlined herein are examples and can be implemented in any combination thereof, including combinations that exclude, add, or modify certain steps.

At step 405, the method can discover a path from a first endpoint (e.g., virtual machine, etc.) in a first public cloud (e.g., 102) to a second endpoint (e.g., virtual machine) in a second public cloud (e.g., 104). The path can include one or more nodes between the path, including the endpoints and routers along the route, etc. In some examples, a first virtual machine in an first cloud (e.g., Site A) can initiate communication with a second virtual machine in a second cloud (e.g., Site B). The path between the virtual machines can be from the first virtual machine, through a virtual gateway (e.g., 128) in a spoke virtual private network (e.g., 110) and a router (e.g., 126) in a hub virtual private network (e.g., 126) to a virtual gateway (e.g., 130) in a spoke virtual private network (e.g., 112) connected to the hub private network (e.g., 126) and finally to the second virtual machine in the second public cloud (e.g., 104).

At step 410, the nodes in the discovered path can provide their respective runtime policy table capacities. For example, the virtual machines, routers, etc., in the path can send to their respective cloud controllers, capacities of their runtime policy tables. For example, a router can send to an associated cloud controller a total and/or remaining capacity for installing or implementing policy rules. To illustrate, the specific router may have capacity to implement X number of rules before reaching its capacity of Y number of rules (e.g., the 300-rule limit). In this example, the router can report to the associated cloud controller that it has a total capacity for Y number of rules and/or a remaining capacity for X number of rules (in addition to those already installed or implemented at the router). The cloud controller (from each public cloud) can then transmit the capacity of the runtime policy tables of each node to the MSC 114.

At step 415, policy enforcement for the path can be split based on the capacities of the runtime policy tables of the nodes. Upon receiving the capacities of the runtime policy tables for the nodes in the path, the MSC 114 can determine what nodes should install or implement policies for the flow of traffic associated with the first and second endpoints (and/or associated EPGs). The MSC 114 can also determine which policies and/or how many policies (if any) should be deployed or implemented on each node. Thus, the policy rules for the flow associated with the first and second endpoints can be distributed across nodes determined to have available capacity to implement the policy rules for the flow. Further, the policies can be configured based on the nodes on which they are installed. In some cases, policy enforcement is either on ingress or egress. In other examples with policy splitting, the policy enforcement is distributed across the ingress and egress paths based on available resources, as described above.

At optional step 420, which is not necessarily run during each deployment of splitting policy rules, policies can be aged and cleaned up. For example, after a threshold period (e.g., 5 minutes, etc.) of the policy rules being activated, the policy rules can be removed from the node(s). In other examples, the policy rules can be removed after a threshold period of the policy being utilized or inactive.

In some implementations of the method 400, the MSC 114 can manage the policy or logic for mapping (and/or classifying) endpoints to specific EPGs and can manage the corresponding rules to, for example, restrict communication to other EPGs and external endpoints. For example, when an endpoint, such as VM or associated network interface, becomes active or is deployed in the public cloud 102, the controller 116 on the public cloud 102 can detect the VM and associate it with one or more EPGs. In some cases, instead of pushing the rules to the VM, the controller 116 can enable flow logging for the interface on the VM.

When the VM initiates a flow to another VM, the controller 116 triggers the on-demand flow-based policy splitting and enforcement described herein. The trigger can include the flow details including the destination address of the flow. The controller 116 can look up the destination VM within the cloud site (e.g., 102) associated with the controller 116 and, if it finds the destination VM, the controller 116 can fetch the security groups (e.g., 120) corresponding to one or more EPGs associated with the destination VM. If the destination VM is not in the cloud site, the controller 116 hierarchically looks up the MSC 114, which can relay the request to the other controllers (e.g., 118, 146) in the multi-cloud environment. If the endpoint is located behind an EPG in one of the other sites, the controller can fetch the corresponding EPG. The controller then looks up the contract rules between the EPGs associated with the origin and destination endpoints and creates the rules for the endpoints based on the rules associated with the EPGs.

In some cases, the controller can create an aging cache for flow associated with the origin and destination endpoints, and update it based on the flow log information. When the cache ages and/or reaches a aging threshold, the controller can remove the rules from the node(s) they are installed on.

In some implementations, the method 400 can assign labels to flows and aggregate routes and/or EPGs based on a flow between endpoints. For example, labels can be assigned to each consumer/provider flow. The controller (e.g., 114, 116, 118, 146) can check labels and rules assigned per label, and find common rules and specific rules across labels. The controller can extract common rules into aggregate labels and/or rules, and enforce rules based on aggregate labels and specific labels and based on the policy placement techniques described herein.

For example, a controller can split specific rules between on an ingress endpoint as outbound rules and an egress endpoint as inbound rules, and offload the common rules the middle or transit nodes such as routers 124, 126 on the hub or infra private networks 106, 108. Aggregate labels can be enforced in the lookups in the routers for fetching the associated policy group (e.g., EPG). In some cases, the lookups can be based on address (e.g., IP) to SGT (security group tag) mappings in the routers. In other examples, other types of lookups can be implemented, such as lookups based on packet header details. The lookups can identify the EPG(s) in the on-premises site 144 that correspond to a particular flow and/or communicating endpoints. In some cases, group and/or traffic labels (e.g., EPG labels, flow labels, etc.), can be transmitted in packet frames if the tunneling header (e.g., i-VxLAN, VxLAN-GPO, etc.) supports it. In some cases, an EPG label in a packet can become a function of EPG classification and/or grouping of similar EPGs which have common rules in the path of a flow.

In some implementations, policies can be grouped into a specific node(s) in the path of an associated flow based on a consolidation of a set of rules associated with the flow (e.g., associated with the source address, the destination address, etc.) to conserve resources. For instance, to consume a shared service such as DNS (dynamic naming system), there may be many EPGs consuming a contract from a DNS EPG which can have multiple endpoints in different sites. In this example, it may be more efficient to pin the DNS EPG to one or more cloud routers in the path and have all the other EPGs go through one set of rules to talk to the DNS EPG. Routing can be manipulated so that traffic towards the DNS EPG endpoints ends up or is routed through a specific node on the path. Similarly, if there are scope wide rules, such as a rule specifying that any EPG can talk to any other EPG within one routing domain (e.g., a VRF, a VPC, etc.) on specific ports (e.g., TCP ports), the scope rules can be consolidated in one or more nodes.

While the method 400 has been described with respect to communications (and associated policy enforcement) between a first and second public cloud, it should be understood that the method 400 (and/or any of the steps in the method 400) can similarly apply to communications (and associated policy enforcement) between any type of cloud, datacenter, fabric and/or network in a multi-fabric or multi-cloud environment (e.g., 100). For example, the method 400 (and/or any of the steps in the method 400) can similarly apply to communications (and associated policy enforcement) between an on-premises site (e.g., 144) and one or more public clouds (e.g., 102, 104) or between any number of clouds (private and/or public), on-premises sites, fabrics, datacenters, etc. The first public cloud and the second public cloud described in method 400 are provided as non-limiting examples for illustration purposes.

The disclosure now turns to FIGS. 5 and 6, which illustrate example network devices and computing devices, such as switches, routers, client devices, and so forth.

FIG. 5 illustrates an example network device 500 suitable for implementing policy splitting and enforcement operations, as well as switching, routing, and other networking operations. Network device 500 includes a central processing unit (CPU) 504, interfaces 502, and a connection 510 (e.g., a PCI bus). When acting under the control of appropriate software or firmware, the CPU 504 is responsible for executing packet management, error detection, and/or routing functions. The CPU 504 preferably accomplishes all these functions under the control of software including an operating system and any appropriate applications software. CPU 504 may include one or more processors 508, such as a processor from the INTEL X86 family of microprocessors. In some cases, processor 508 can be specially designed hardware for controlling the operations of network device 500. In some cases, a memory 506 (e.g., non-volatile RAM, ROM, etc.) also forms part of CPU 504. However, there are many different ways in which memory could be coupled to the system.

The interfaces 502 are typically provided as modular interface cards (sometimes referred to as "line cards"). Generally, they control the sending and receiving of data packets over the network and sometimes support other peripherals used with the network device 500. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 504 to efficiently perform routing computations, network diagnostics, security functions, etc.

Although the system shown in FIG. 5 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 500.

Regardless of the network device's configuration, it may employ one or more memories or memory modules (including memory 506) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 506 could also hold various software containers and virtualized execution environments and data.

The network device 500 can also include an application-specific integrated circuit (ASIC), which can be configured to perform routing and/or switching operations. The ASIC can communicate with other components in the network device 500 via the connection 510, to exchange data and signals and coordinate various types of operations by the network device 500, such as routing, switching, and/or data storage operations, for example.

FIG. 6 illustrates a computing system architecture 600 wherein the components of the system are in electrical communication with each other using a connection 605, such as a bus. Exemplary system 600 includes a processing unit (CPU or processor) 610 and a system connection 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware or software service, such as service 1 632, service 2 634, and service 3 636 stored in storage device 630, configured to control the processor 610 as well as a special-purpose processor where software instructions are incorporated into the actual processor design. The processor 610 may be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include services 632, 634, 636 for controlling the processor 610. Other hardware or software modules are contemplated. The storage device 630 can be connected to the system connection 605. In one aspect, a hardware module that performs a particular function can include the software component stored in a computer-readable medium in connection with the necessary hardware components, such as the processor 610, connection 605, output device 635, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:
1. A system comprising:
one or more processors; and
at least one computer-readable storage medium having stored therein instructions which, when executed by the one or more processors, cause the system to:
discover a path from a first endpoint in a first cloud to a second endpoint in a second cloud;
determine runtime policy table capacities associated with nodes in the path, wherein corresponding runtime policy table capacities for the nodes in the path indicate a total capacity of each of the nodes for implementing rules of policies;
determine policy distribution for splitting the policies on a per-node basis across at least a portion of a plurality of nodes in the path and enforcement for traffic from the first endpoint to the second endpoint according to the runtime policy table capacities associated with the nodes in the path;
install the policies on a set of the nodes in the path based on the policy distribution and the enforcement; and apply the policies to data transmitted from the first endpoint in the first cloud to the second endpoint in the second cloud.

2. The system of claim 1, wherein the discovering the path further comprises determining the plurality of nodes in the path.

3. The system of claim 2, wherein determining the runtime policy table capacities and the policy distribution and enforcement comprises:
performing a runtime check on a respective policy table capacity of a subset of nodes from the plurality of nodes in the path;
determining, based on the runtime check, at least one node from the subset of nodes on which to install at least a portion of the policies;
running a destination address of the second endpoint against one or more routing tables in the path leading to the node; and
fetching a widest subnet in the path that includes a respective address of the node.

4. The system of claim 3, wherein installing policies comprises installing a policy enabling traffic for the widest subnet, the policy being installed at one of the first endpoint, the second endpoint, or the node in the path.

5. The system of claim 3, further comprising additional instructions stored in the at least one computer-readable storage medium which, when executed by the one or more processors, cause the system to:
install, at the node, one or more filters which only allow traffic from the first endpoint to the second endpoint for one or more specified ports in a contract between a first endpoint group including the first endpoint and a second endpoint group including the second endpoint.

6. The system of claim 1, wherein the policy distribution and enforcement comprises a funnel enforcement installed at the first endpoint.

7. The system of claim 1, further comprising additional instructions stored in the at least one computer-readable storage medium which, when executed by the one or more processors, cause the system to:
determine an age of one or more policies installed on at least one of the first endpoint, the second endpoint and one or more of the nodes in the path; and
in response to the age of a policy being greater than a threshold age, removing the policy.

8. A non-transitory computer-readable storage medium comprising:
instructions stored therein instructions which, when executed by one or more processors, cause the one or more processors to:
discover a path from a first endpoint in a first cloud to a second endpoint in a second cloud;
obtain runtime policy table capacities associated with nodes in the path, wherein corresponding runtime policy table capacities for the nodes in the path indicate a total capacity of each of the nodes for implementing rules of policies;
determine policy distribution for splitting the policies on a per-node basis across at least a portion of a plurality of nodes in the path and enforcement for traffic from the first endpoint to the second endpoint according to the runtime policy table capacities;
install a set of the policies on a set of the nodes in the path based on the determined policy distribution and enforcement in the path, the set of policies being associated with the traffic from the first endpoint to the second endpoint; and
apply the set of the policies to traffic from the first endpoint in the first cloud to the second endpoint in the second cloud.

9. The non-transitory computer-readable storage medium of claim 8, wherein discovering the path comprises identifying the plurality of nodes in the path.

10. The non-transitory computer-readable storage medium of claim 9, storing additional instructions which, when executed by the one or more processors, cause the one or more processors to:
perform a runtime check on a respective policy table capacity of a subset of nodes of the plurality of nodes in the path;
determine, based on the runtime check, at least one node from the subset of nodes to install at least some of the set of policies;
run a destination address of the second endpoint against routing tables in the path leading to the node; and
fetch a widest subnet in the path that includes at least one of the node and an address associated with the node.

11. The non-transitory computer-readable storage medium of claim 10, wherein installing the set of policies comprises installing a policy enabling traffic for the widest subnet at the first endpoint.

12. The non-transitory computer-readable storage medium of claim 10, storing additional instructions which, when executed by the one or more processors, cause the one or more processors to:
install, at the node, one or more filters which only allow traffic from the first endpoint to the second endpoint for one or more specified ports in a contract between a first endpoint group including the first endpoint and a second endpoint group including the second endpoint.

13. The non-transitory computer-readable storage medium of claim 8, wherein the policy distribution and enforcement comprises a funnel enforcement installed at the first endpoint.

14. The non-transitory computer-readable storage medium of claim 8, storing additional instructions which, when executed by the one or more processors, cause the one or more processors to:
determine an age of one or more policies installed on at least one of the first endpoint, the second endpoint, and the set of nodes in the path; and
in response to the age of a policy being greater than a threshold age, remove the policy.

15. A method comprising:
discovering a path from a first endpoint in a first cloud to a second endpoint in a second cloud;
determining runtime policy table capacities associated with nodes in the path, wherein corresponding runtime policy table capacities for the nodes in the path indicate a total capacity of each of the nodes for implementing rules of policies;
determining a policy distribution for splitting the policies on a per-node basis across at least a portion of a plurality of nodes in the path and enforcement based on the runtime policy table capacities;
based on the policy distribution and enforcement, installing a set of the policies for traffic from the first endpoint to the second endpoint across a set of nodes in the path; and
applying the set of the policies to traffic from the first endpoint in the first cloud to the second endpoint in the second cloud.

16. The method of claim 15, wherein discovering the path comprises determining the plurality of nodes in the path.

17. The method of claim 16, further comprising:
performing a runtime check on a respective policy table capacity of a subset of nodes of the plurality of nodes in the path;
determining, based on the runtime check, at least one node of the plurality of nodes to install the set of policies;
running a destination address of the second endpoint against routing tables in the path leading to the node; and
fetching a widest subnet in the path that includes at least one of the node and an address associated with the node.

18. The method of claim 17, wherein installing the set of policies comprises installing a policy enabling traffic for the widest subnet, the policy being installed at one of the first endpoint, the second endpoint, and the node in the path.

19. The method of claim 18, further comprising:
installing, at the node, one or more filters which only allow traffic from the first endpoint to the second endpoint for one or more specified ports in a contract between a first endpoint group including the first endpoint and a second endpoint group including the second endpoint.

20. The method of claim 15, further comprising:
determining an age of one or more policies installed on at least one of the first endpoint, the second endpoint, and the set of nodes; and
in response the age of a policy being greater than a threshold age, removing the policy.

* * * * *